E WAGONER.
Seed-Drill Teeth.

No. 60,096. Patented Nov. 27, 1866.

Witnesses:
Chas. D. Smith
Chas. A. Pettit

Inventor:
Elijah Wagoner
By Munn & Co
Attorneys

United States Patent Office.

IMPROVEMENT IN GRAIN DRILLS.

ELIJAH WAGONER, OF WESTMINSTER, MARYLAND.

Letters Patent No. 60,096, dated November 27, 1866.

SPECIFICATION.

TO ALL WHOM IT MAY CONCERN:

Be it known that I, ELIJAH WAGONER, of Westminster, in the county of Carroll, and State of Maryland, have invented a new and useful Improvement in Grain Drill; and I do hereby declare the following to be a full, clear, and exact description of the nature, construction, and operation of the same, reference being had to the accompanying drawings, which make part of this specification, and in which—

Similar letters of reference indicate corresponding parts in the three figures.

My said invention consists in a novel and simple mode of combining a lever, elastic attaching bars, and an India-rubber spring, with the drill-tube, for the purpose of adapting the latter to yield or give backward to and override any immovable object with which it may come in contact, and resume its operating position when such object is passed.

The following description will enable others skilled in the art to which my invention appertains to fully understand and use the same.

Figure 1:
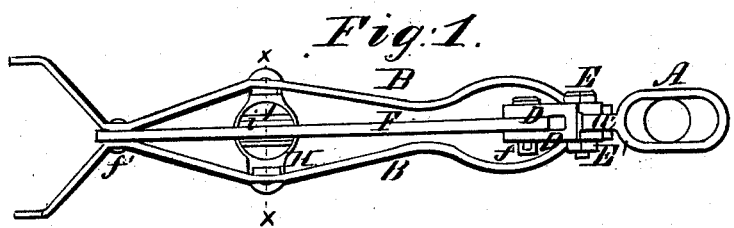
Figure 1 is a plan view of my improved drill.
Figure 2:
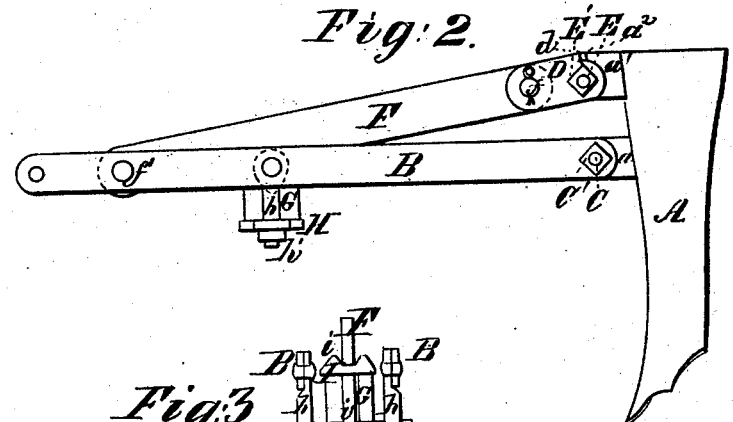
Figure 2 is a side elevation of the same.
Figure 3:
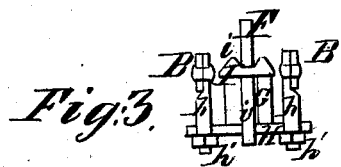
Figure 3 is a transverse section of the same in the line $xx$.

In the accompanying drawings, A may represent the metallic drill-tube, which conducts the seed from the seeding machine and forms the furrow or drill into which the seed is deposited. This drill-tube is attached to the seeding machine by two crooked bars, B B, which are fastened to the seeding machine at their forward ends in any suitable manner. The rear ends of the bars B B are connected together as well as pivoted to the lug $a$ on drill A, by means of the bolt C, and nut C'. $a^1$ is a lug occupying a higher position on the drill A than lug $a$, and affording a point of attachment for a two-part link, D D, which is attached to said lug $a^1$ by the bolt E and nut E'. F is a lever, the rear end of which is pivoted at $f$ to the link D D, and the opposite end of which is pivoted to the forward ends of bars B B, by the pivot $f'$. G is a rubber spring held within a stirrup, H, and occupying a position between the latter and the lever F. The spring G may be of tubular or other suitable form, and is of sufficient strength to brace up the pivoted lever F, so as to adapt it to hold the drill in its working position while moving through the soil. The stirrup H is held upon the short stems or arms, $h\ h$, by nuts, $h'\ h'$, and the arms $h$ are riveted to the bars B B. A washer, I, is interposed between the spring G and lever F, and a crease, $i$, is formed in the washer for the lever F to rest in. A stem or shank, $i'$, is attached to or formed in one piece with the washer I, and projects downward through the centre of the spring G and stirrup H. $a^2$ is a shoulder formed on the lug $a^1$; and owing to the infringement of a corresponding shoulder, $d$, on the link D, against shoulder $a^2$, when the drill is forced backward by an obstacle, the link D cannot possibly rise above the lug $a^1$, but must necessarily be depressed and force the rear end of the lever F down with it. This depression of the bracing lever F permits the point of the drill A to turn backward in the arc of a circle, and thus override any obstacles which it may meet. The depression of the lever F contracts the spring G, so that when the obstruction is passed the lever F is elevated by the spring G, and the drill A thus made to resume its normal operating position. By referring to fig. 2 it will be perceived that a straight line drawn from $f$ to E would pass below the centre of the pivot $f'$, which connects the rear end of the lever F to the forward end of link D. This being the usual relative position of the joints, or the position they occupy during the undisturbed operation of the drill, it is manifest that inasmuch as the forward end of the link D can only be turned downward by the backward motion of the operating end of the drill A, the rear end of the lever F could not yield downward to undue strain applied to the drill without increasing the distances between the points $f'$ and E to an extent equal to the distance between the centre of pivot $f$ and an imaginary straight line drawn from $f'$ to E. I provide for this temporary increase of distance between $f'$ and E, by making the bars B B of zigzag, curved, crooked, or of any other suitable shape, so that they shall be elastic and capable of extension when sufficient resistance is offered to the drill A to render its backward and upward deflection necessary. Thus when the drill strikes an immovable obstacle the bars B B are elongated by the strain, and the distance from C and E to $f'$ is increased sufficiently to permit the joint $f$ to move downward in the arc of a circle; hence the drill, A, then vibrates upon its pivot C, and the lever F contracts the spring G, for the purpose of restoring the drill and lever to their normal positions when the obstruction is passed. The bars B B will only elongate under undue strain, and hence the drill is firmly held to its work and prevented from yielding or vibrating during its passage through the soil. The power of the spring G may be increased or diminished by adjusting the nuts $h'$.

I do not wish to be understood as claiming novelty in the employment of the spring G, or lever F, or connecting link D, broadly considered, as I am aware that these parts have been in use long before the date of my application, and that they have been combined with a grain drill in various ways.

Having thus described my invention, the following is what I claim as new herein, and desire to secure by Letters Patent:

1. I claim the combination of the drill A, elastic bars B B, lever F, spring G, and link D, substantially as and for the purpose herein specified.

2. In combination with the above part, I claim the link D D, and lug $a^1$, when formed with the shoulders $a^2$, $d$, in the manner and for the purpose set forth.

3. I claim the stem or shank $i'$, when formed as a part of the washer I, and employed in connection with the spring G, bars B B, and stirrup H, as described.

ELIJAH WAGONER.

Witnesses:
P. J. BARTHOLOW,
CHAS. BILLINGSLEA.